(12) United States Patent
Hirsch

(10) Patent No.: US 6,738,552 B2
(45) Date of Patent: May 18, 2004

(54) PRESSED CAPILLARY OPTICS

(76) Inventor: Gregory Hirsch, 580 Crespi Dr. Suite A6-128, Pacifica, CA (US) 94044

(*) Notice: Subject to any disclaimer, the term of this patent is extended or adjusted under 35 U.S.C. 154(b) by 12 days.

(21) Appl. No.: 10/056,661

(22) Filed: Jan. 22, 2002

(65) Prior Publication Data

US 2002/0126966 A1 Sep. 12, 2002

Related U.S. Application Data

(60) Provisional application No. 60/263,575, filed on Jan. 22, 2001.

(51) Int. Cl.[7] .................................................. G02B 6/20
(52) U.S. Cl. .................... 385/133; 385/125; 378/145; 65/393; 264/1.24; 264/1.25
(58) Field of Search .................. 385/50–52, 55, 385/54, 62, 65, 68, 83, 99, 137, 125; 264/1.1, 1.24, 1.25; 65/102, 106, 226, 404, 407, 408, 393; 378/145, 147–151

(56) References Cited

U.S. PATENT DOCUMENTS

| | | | |
|---|---|---|---|
| 2,628,936 A | 2/1953 | Albano | |
| 4,109,369 A * | 8/1978 | Taylor | ........................ 29/467 |
| 4,445,751 A | 5/1984 | Divens et al. | |
| 4,513,190 A | 4/1985 | Ellett et al. | |
| 4,564,417 A | 1/1986 | Schoen et al. | |
| 4,750,806 A | 6/1988 | Biswas | |
| 4,853,020 A | 8/1989 | Sink | |
| 5,100,507 A | 3/1992 | Cholewa et al. | |
| 5,101,422 A | 3/1992 | Thiel et al. | |
| 5,290,398 A | 3/1994 | Feldman et al. | |
| 5,425,118 A * | 6/1995 | Sugihara et al. | .............. 385/51 |
| 5,480,049 A | 1/1996 | Marchman | |
| 5,662,817 A | 9/1997 | Honmou | |
| 5,772,903 A | 6/1998 | Hirsch | |
| 5,937,128 A * | 8/1999 | Robertsson | ................. 385/129 |
| 6,105,395 A * | 8/2000 | Yoshida et al. | ............... 65/102 |
| 6,126,844 A | 10/2000 | Hirsch | |
| 6,539,157 B2 * | 3/2003 | Doi | ........................... 385/129 |

FOREIGN PATENT DOCUMENTS

DE          3940777 A1 * 6/1991          G02B/6/38

* cited by examiner

*Primary Examiner*—Hemang Sanghavi
*Assistant Examiner*—Scott A Knauss
(74) *Attorney, Agent, or Firm*—William Michael Hynes; Townsend and Townsend and Crew LLP

(57) ABSTRACT

A capillary optic produced by impression has a mold with an external profile figured for radiation transmission along an axis used as a mandrel for impression. The mold often takes the form of a precisely etched wire. At least one soft plate is used for impressing the mold into the soft plate. The mold is removed from the soft plate to leave a vacant impression figured for radiation transmission in the soft plate along an axis. The impression is then closed to provide for radiation transmission along the axis of the impression. In the most common embodiment, two relatively soft plates having identical compositions with flat and highly polished initial surfaces are used. The impression(s) can be coated with reflective materials. Disclosure of an optical connector and emitter is included.

27 Claims, 13 Drawing Sheets

PRESSED CAPILLARY OPTICS

CROSS-REFERENCES TO RELATED APPLICATIONS

This application claims priority from Provisional Patent Application No. 60/263,575, filed Jan. 22, 2001 by the named inventor herein entitled Pressed Capillary Optics, Attorney Docket No. 11071-000700US, is likewise incorporated by reference as if fully set forth herein.

This invention relates to the use of optics to produce a directed beam of radiation by grazing-incidence reflection. More particularly, a monocapillary optic is disclosed which is produced by creating a precisely shaped mold which has the desired figure of the final capillary optic's internal bore. The mold most commonly takes the form of a precisely etched wire. The mold is used as a mandrel for the production of a capillary optic by placing it between two polished and generally flat plates composed of a relatively soft material, and applying pressure. The profile of the mold is imprinted into the surfaces of the flat plates and is thus replicated. The plates are disassembled, the mold removed, and the two plates are reassembled to form the final capillary optic. In some instances, a reflection enhancing film is applied before the final assembly step. More than one mold can be used in the process to create a polycapillary optic. The resultant optics can be used to produce either a collimated beam or a focused spot of photons, neutrons, or charged particles.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

BACKGROUND OF THE INVENTION

The introduction of x-ray analysis has been one of the most significant developments in twentieth-century science and technology. The use of x-ray diffraction, spectroscopy, imaging, and other techniques has led to a profound increase in our knowledge in all scientific fields. The capabilities of x-ray analysis have expanded consistently with the availability of ever more powerful sources of radiation. The standard x-ray tube has seen a relatively gradual increase in performance over many decades. Notable improvements in x-ray tube technology include the introduction of rotating anode sources and microfocus tubes. Although many experiments are now performed using rotating anode sources that have significantly higher power capabilities than stationary anode tubes, these sources are quite expensive and can consume over ten kilowatts of input power. Recently, with the introduction of improved x-ray focusing optics, the ability to use small, low power microfocus x-ray sources to achieve x-ray beam intensities comparable to that achieved with rotating anode tubes has been demonstrated. It has been demonstrated that a microfocus source running at a few tens of watts input-power, in conjunction with focusing optics, can produce beams with brightness comparable to a multi-kilowatt rotating anode source. Such combined small sources and collection optics will greatly expand the capabilities of x-ray analysis equipment in small laboratories. The optimization of x-ray optics for these applications is of crucial importance for realizing the potential of these laboratory instruments.

The advent of synchrotron radiation sources over the past several decades has produced a revolution in x-ray science. Due to the extreme brightness of these sources, measurements that were not possible in the past have become routine. This brightness allows the use of microfocusing optics to create very small x-ray microbeams with greatly enhanced flux densities. These microbeams have allowed measurements of samples with unprecedented spatial resolution and small size. Improvements to these optics are highly desirable to allow the full potential of synchrotron sources to be achieved.

In addition to sources of X-rays, there has been a significant increase in the capabilities of neutron sources, many of which exist as user facilities in a manner similar to synchrotron radiation sources. Both reactor and spallation sources have been built with ever increasing neutron fluxes. For certain applications such as prompt-gamma activation analysis and neutron depth profiling, it is very desirable to produce a focused beam of thermal or cold neutrons. The use of small beams is also advantageous for neutron diffraction applications. There have been advances in neutron focusing optics over the past few years. Further improvements to these optics will have a large impact on the capabilities of these neutron facilities.

There have been dramatic developments in the field of x-ray optics. Many different types of optical elements have been introduced or improved for the manipulation of short wavelength photons. In the specific area of focusing optics, several different types of lenses and focusing mirrors have been produced. These optics include: zone plates, Bragg-Fresnel zone plates, multi-layer-focusing mirrors, grazing incidence mirrors, compound refractive lenses, and capillary optics. In addition to x-ray photons, these optical elements can be used for the focusing of neutrons and charged particle beams.

In the area of capillary optics, there are two basic types—monocapillary optics and polycapillary optics. The invention we will be discussing here involves improvements to both types of these optics. Although we will concentrate mainly on their use for the manipulation of x-rays, we will also discuss their use for the focusing and collimation of visible and near visible light. In particular, the use of the optics with laser light in fiber-optic communications applications is potentially very important and practical.

Although there exist x-ray optics that use reflection, diffraction, or refraction for their operation, we are concerned specifically with reflective optics in this invention. It is well known that x-rays incident on a surface at sufficiently small angles of incidence will be reflected by total external reflection. The largest angle of incidence for reflection (critical angle) is determined by the refractive index of the material:

$$n = 1 - \delta - i\beta$$

Using Snell's Law, we can derive this angle as:

$$\theta_c = (2\delta)^{1/2} \text{ (assuming } \beta=0\text{)}$$

The theoretical value for $\delta$ is:

$$\delta = \tfrac{1}{2}(e^2/mc^2)(N_0 \rho/A) Z \lambda^2 = 2.70 \times 10^{10} (Z/A) \rho \lambda^2$$

The angles are quite small since the refractive index for x-rays is very close to unity for all materials. For example, the critical angle for borosilicate glass at $\lambda=1$Å is less than 3 milliradians. For achieving the highest critical angles, high-density materials such as gold or platinum are desirable.

In the case of neutrons, grazing incidence reflection can also be used for producing optical devices. The critical angle for reflection of neutrons is:

$$\theta_c = \lambda(Nb/\pi)^{1/2}$$

Where b is the coherent scattering length and N is the number of nuclei per cm$^3$. The best natural material for achieving the highest critical angle for neutron reflection is nickel. The isotope Ni-58 is especially good, having a critical angle of approximately 2.1 milliradians/Å.

In addition to single-layer reflecting materials, multilayer coatings can be produced which rely on Bragg reflection to achieve high reflectivity. These layers are composed of a high-Z material that exhibits large coherent scattering for the radiation being reflected, with alternating low-Z layers that function as spacers. In the case of x-rays, the most common high-Z materials are tungsten or molybdenum, while the low-Z spacer is usually silicon, carbon, or beryllium. In the case of neutron reflection, these multilayer coatings are often referred to as "supermirrors." Neutron supermirrors differ from standard x-ray multilayers in that the d-spacing of the layers is not constant, but increases for the layers towards the surface of the mirror. Supermirror structures are generally composed of layers of nickel or a nickel alloy, with spacer layers of titanium.

Reflective x-ray optics can be classified into several different categories. One class of optics uses grazing reflection from extended mirror surfaces. The most common mirror arrangements have an ellipsoidal or toroidal surface figure for two-dimensional focusing of radiation. Another common geometry uses two spherical mirrors oriented sequentially in the vertical and horizontal planes, in an arrangement known as a Kirkpatrick-Baez configuration. An absolute requirement for all reflective x-ray optics is the need to have exceedingly smooth reflecting surfaces due to the small wavelength of the radiation. In general, the surface roughness should be better than 1 nanometer rms.

A different approach for reflective x-ray optics uses the ability of fine glass capillaries to act as reflective guide tubes for x-rays, in a similar manner to fiber optics. Several different configurations of these capillary optics exist. One type of optic, sometimes known as a "Khomakov Lens", uses a number of discreet curved glass-capillary tubes that are precisely mounted in a frame that independently holds each capillary's curved position along the device. In some optics, each carefully positioned capillary fiber is actually a bundle of many much smaller capillary tubes. X-rays are guided through each capillary by multiple reflections along the outer arc of the capillary tube's interior surface. This mode of reflection is sometimes referred to as a "Whispering Gallery". With such optics, the divergent radiation from an x-ray tube's focal spot can be redirected into either a collimated beam, or condensed back to a small spot a significant distance from the source. This type of optic is not capable of producing spots smaller than approximately 500 microns; the diameter of each fiber. This type of optic is sometimes referred to as a "multifiber optic."

A different type of multicapillary optic uses a single multicapillary bundle that is drawn at elevated temperature so as to have a taper on one or both ends. This type of optic is sometimes referred to as a "monolithic optic." Unlike the multifiber optic, the individual glass channels do not have a constant diameter along their length. This type of optic functions in a similar manner to the multifiber type of optic, but has certain properties that are advantageous in some applications. The smallest spot sizes achievable with this type of optic are approximately 20 microns or larger, while quasi-parallel beam sizes are generally several mm in diameter. Both types of multicapillary optics possess the very attractive ability to collect a large solid angle of radiation emitted from the source. Their main disadvantage is their relatively high cost, and their inability to form very small focused or collimated beams. In addition, the reflecting surfaces are composed of bare glass, which has a relatively small critical angle. This causes the optics to cease to transmit efficiently at higher photon energies. Both the multifiber and the monolithic optics can also be used as bending optics by curving the capillary bundle. It is possible for a single optic to have a bending section and a focusing section.

Both the monolithic and the multifiber optics are manufactured and sold by X-ray Optical Systems which is located in Albany, N.Y. This company holds a number of patents regarding this technology.

In addition to the previously described capillary optics having multiple channels, a single tapered-capillary may be used effectively to collimate or focus radiation. This tapered monocapillary optic has achieved the smallest spot sizes of any type of x-ray optical device. Their most dramatic use has been with synchrotron radiation where the almost parallel input beam can be condensed to sizes well below 1 micron (0.05 microns has been achieved). It is important to note that tapered monocapillary optics can function in two different focusing modes. In one case, the capillary acts as a true focusing lens, with each photon undergoing a single bounce. In this case, a focal spot is produced some distance beyond the capillary exit. In a different type of capillary optic, photons undergo multiple bounces on their way to the exit and the smallest beam diameter is found directly at the exit aperture. This type of optic is often referred to as a capillary condenser, to draw the distinction from a true lens. The smallest beams have been produced by the condenser type optics, although the small working distance from the exit aperture can be a disadvantage.

A glass monocapillary optic is produced by heating and drawing a length of glass capillary tubing to a smaller diameter. There has been significant progress in forming glass capillaries with paraboloidal or ellipsoidal shapes, but the slope errors and straightness of the capillary shapes have been difficult to reliably reproduce. It has also not been feasible to coat the inside of these very small capillaries with a different material to enhance the reflectivity at higher energies or reflection angles. In addition to a low angle for total external reflection, glass has the disadvantage of transmitting a significant amount of the radiation that is not reflected by the capillary bore due to its low density and atomic number. This radiation continues to propagate through the glass material and passes out through the end of the optic. These photons produce what is known as the "halo effect" in both monocapillary and polycapillary type optics, and has the effect of increasing the effective size of focused beam.

In addition to the glass monocapillary optics produced by the drawing method, a different technique has been devised to produce metal reflective optics by a replicating process on a removable mandrel using electroforming. The optics produced by these replication methods fall into a category somewhere between standard reflecting optics and true capillary optics, due to their larger bore size. The smallest dimensions of their bores are generally near 0.5–1 mm.

These replicated optics are produced by Reflex s.r.o in the Czech Republic.

U.S. Pat. No. 5,772,903 (1998) entitled TAPERED CAPILLARY OPTICS describes a different technique to produce tapered monocapillary optics that have significant advantages over the tapered glass capillaries. That patent describes a method to produce a capillary structure having a well-controlled taper profile, a high degree of straightness, an extremely smooth internal reflecting surface, and wide latitude in the selection of materials for the internal bore. The extremely small dimensions (<1 micron) achievable by the methods delineated in that patent are unique for non-glass capillaries.

U.S. Pat. No. 6,126,844 (2000) entitled TAPERED MONOCAPILLARY-OPTICS FOR POINT SOURCE APPLICATIONS describes certain improvements to the process for producing monocapillary optics described in U.S. Pat. No. 5,772,903. This patent is especially directed at applications where the radiation originates from a point-like source. Both paraboloidal, and full ellipsoidal capillary shapes are disclosed.

In both of the above referenced patents, a precisely tapered wire is first produced by the precise differential etching of a starting wire material. The shape of this etched wire is most commonly paraboloidal or ellipsoidal. The wire is then coated with a layer chosen to maximize the final optic's reflectivity. A thicker reinforcing layer is applied after the reflective coating. This coated wire is then mounted to a substrate, and the wire is removed to leave the hollow bore of the final optic. The wire removal is most often achieved by a chemical etching process that is facilitated by the cutting of a number of narrow grooves perpendicular to the optic axis. Since the wire functions as a mandrel for subsequent forming operations, we refer to it as the "mandrel wire".

A pending U.S. patent, BUNDLED MONOCAPILLARY OPTICS Ser. No. 09/503776 filed Feb. 14, 2000 now U.S. Pat. No. 6,415,086, describes techniques to extend the technology of the above patents into the realm of polycapillary optics. In this patent, methods to create large numbers of wires in a batch operation are described. These wires are coated with a reflecting film, bundled together into an array, and fused together into a rigid monolithic structure. The wires are then removed, in a similar manner to the monocapillary optic. The advantages of these metal optics compared to glass polycapillaries are the same as those pertaining to monocapillary optics.

The invention we will be disclosing here involves an alternate process for forming capillary optics from precisely formed mandrel wires. Instead of the vacuum deposition and electroplating operations disclosed in the previous patents, a purely mechanical process in disclosed for the replication of a wire. The advantage of this process over the previous methods is a much simpler process having fewer processing steps. The resultant optics are free of any etching process generally required in the other methods, which permits a higher degree of cleanliness on the internal surface. This is especially important for low energy x-ray performance. The absence of a chemical etching process also expands on the number of possible reflecting coatings since there are no issues of chemical compatibility to be concerned with.

SUMMARY OF THE INVENTION

A mold is formed into the shape of a capillary optic's desired internal bore. This shape is most commonly paraboloidal or ellipsoidal. This shape is generally, but not necessarily, created by carefully controlling the withdrawal speed of an initially uniform wire from an etchant bath. In the case of a complete ellipsoidal capillary, the etching operation is performed twice in opposite directions on adjacent wire segments. The etched wire undergoes a subsequent operation to create an extremely smooth surface if the as-etched surface is not smooth enough. The wire is then placed between two rigid plates. In the most common embodiment, the two plates are of identical composition and are relatively soft materials, with the initial surfaces being substantially flat and highly polished. This plate-wire-plate sandwich is then mechanically pressed. This results in the wire profile being imprinted in relief into the plate surfaces. The plates are disassembled, and the wire is removed. These surfaces can then be coated with a layer of material that is selected to maximize the reflectivity of the radiation that will be focused. In some cases, this reflection enhancing coating is deposited before the pressing step. This reflective surface may be a single layer for wideband reflectivity, or a multi-layer coating for optimizing the reflectivity in a narrower wavelength interval. The two plates are then carefully aligned, and attached together to form the final capillary optic. In some devices, more than one wire is incorporated in the pressing step, which creates a polycapillary optic. The capillary optic is used for efficiently collecting and redirecting radiation from a source which could be the anode of an x-ray tube, a plasma source, the fluorescent radiation from an electron microprobe, a synchrotron radiation source, fiber optic cables, lasers, neutrons sources, or other radiation sources.

DESCRIPTION OF THE SPECIFIC EMBODIMENTS

U.S. Pat. No. 5,772,903 previously described a fabrication technique for creating tapered monocapillary optics. The patent disclosed a method for creating capillaries with the desired taper profiles on demand that could include paraboloidal, ellipsoidal, conical, or other figures. It is also possible to have a combination of different taper shapes on a single wire, such as a linearly tapered section followed by a paraboloidal or ellipsoidal taper. The basic capillary formation process described in that patent is the following: A wire, generally composed of a metal or glass, is etched with great precision to have a taper having the shape of the bore of the desired final capillary optic. By controlling the rate of removal of the wire from an etchant bath, the precisely controlled taper is produced. The wire velocity can be regulated using a closed-loop control system that uses a sensor to measure the wire diameter or slope of the wire as it leaves the etchant for feedback control. The etched wire sometimes needs to undergo a subsequent treatment to produce an extremely low surface-roughness. This can be a thermal treatment process, or alternately, coating the wire with a material that has an extremely smooth surface and covers the surface roughness of the as-etched wire. The etched and smoothed wire is coated with the material of choice for optimizing the reflectivity of the radiation being used. This is typically a vacuum deposition process such as sputtering, evaporation, or chemical vapor deposition. Aqueous chemical deposition processes are also possible. The coated wire is generally built up with a material to make it more robust, typically with electroplating or electroless deposition. The wire is vertically oriented and tensioned to be straight during this process. In one embodiment, the wire is removed from the built up structure by heating the assembly to liquefy the smoothing layer and physically pulling it out. In a different embodiment, the wire is dissolved away chemically to leave the hollow internal bore of the final tapered capillary optic. When removing the wire chemically, it is generally necessary to open a number of slots along the capillary structure to allow the removal of the wire in a reasonable time period. The capillary is typically mounted to a rigid substrate prior to the removal of the wire.

Figure 1:
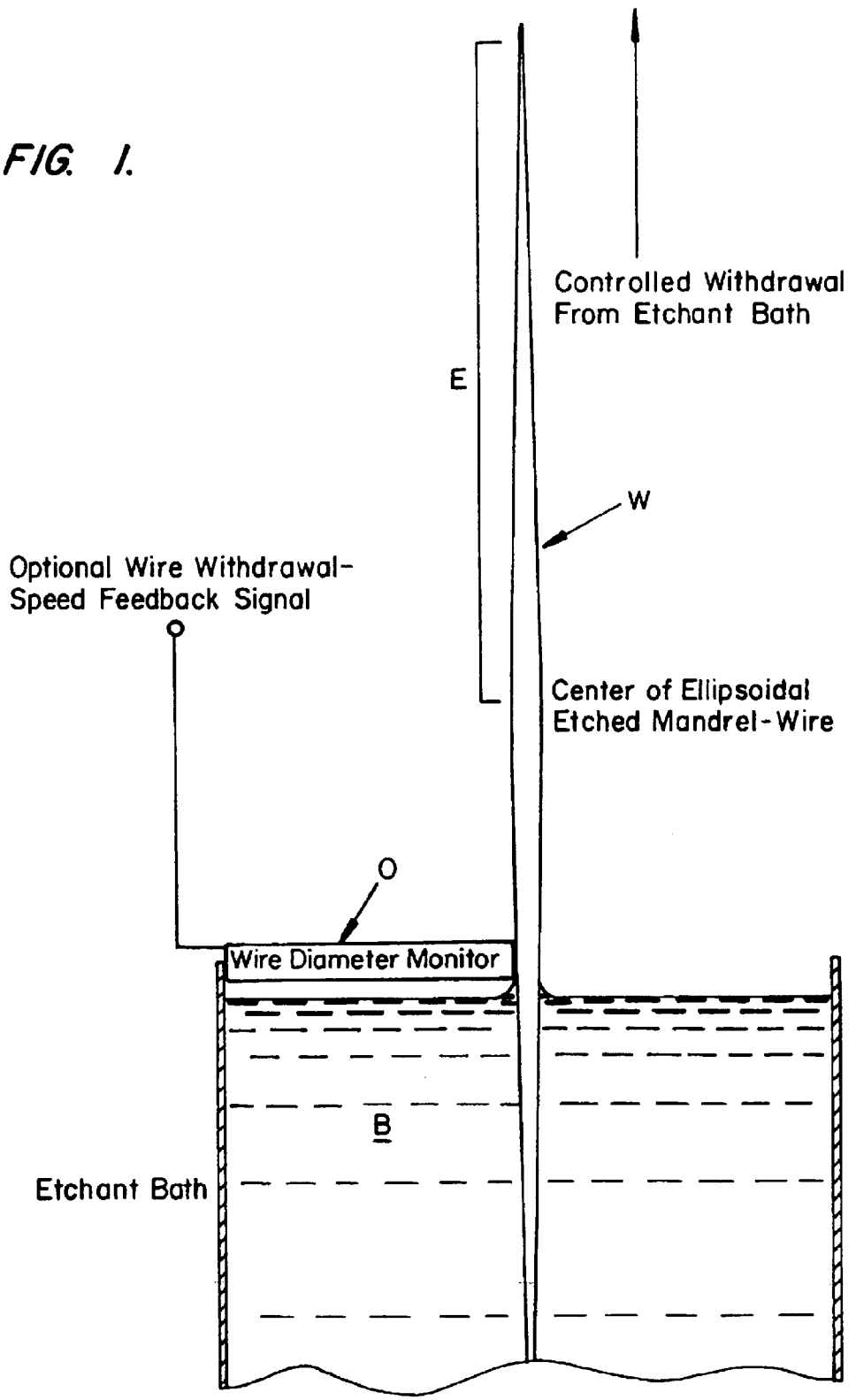
FIG. 1 illustrates a mandrel wire being etched into a full ellipsoidal shape.

U.S. Pat. No. 5,772,903 did not describe the generation of capillaries having full or nearly full ellipsoidal cavities, since the mandrel-wire diameter always decreases as it is removed from the etchant bath. U.S. Pat. No. 6,126,844 disclosed an improvement that permits the production of etched mandrel wires having ellipsoidal shapes and a maximum diameter that does not coincide with the capillary opening. Referring to FIG. 1, a half ellipsoid E has been first formed on the wire W, as described by the previous referenced patent by the controlled withdrawal from an etchant bath B. The wire is then inverted, the etched section of wire is attached to the withdrawal mechanism, and the wire is again lowered into the etchant bath far enough to submerge all of the unetched wire, but no part the etched section. The etching process is then repeated to form the complete ellipsoidal shape. In some cases, a wire diameter monitor O is used for producing a feedback signal to control the withdrawal speed of the wire. The completed capillary is produced as described above. Of course, it is necessary to use chemical dissolution of the wire to form the final capillary interior cavity, as it is not possible to physically pull the wire out of the structure with this geometry.

It has been found that the etching rate of the wire material is often reproducible enough to etch the wire in an open-loop system, and one can dispense with the need for feedback control. In this type of system, the expected velocity sequence is calculated from a measurement of the linear etching rate of the wire material. It is convenient to have a computer calculate the expected velocity program and load this data into the motion controller. If there is any non-linearity of the etching rate versus diameter, this can be experimentally measured and corrected for in the program. It has also been found that certain etching procedure can create extremely smooth surfaces which eliminates the need for a post-etch smoothing treatment.

In the invention described in this patent, a mechanical pressing or stamping step is used to form a capillary optic from a precisely formed mandrel or mold instead of the above described building up process. We will concentrate on the use of precisely tapered wires for mandrels in the disclosure, but it is possible to apply other forms of mandrels such as a raised section on an otherwise flat substrate. This would be similar to a stamping die used to form a complimentary relief pattern on another surface. The scope of this patent includes any capillary optic produced from a pressing step using a previously made mandrel. We concentrate on wires because they are relatively easy to form into very accurate shapes having very small dimensions. It is possible to produce mandrel wires with dimensions in the micron or submicron range, which would be difficult to form by other means. In some cases, it may be advantageous to produce a precisely formed wire and then bond it to another rigid surface to form a type of stamping die.

Figure 2:
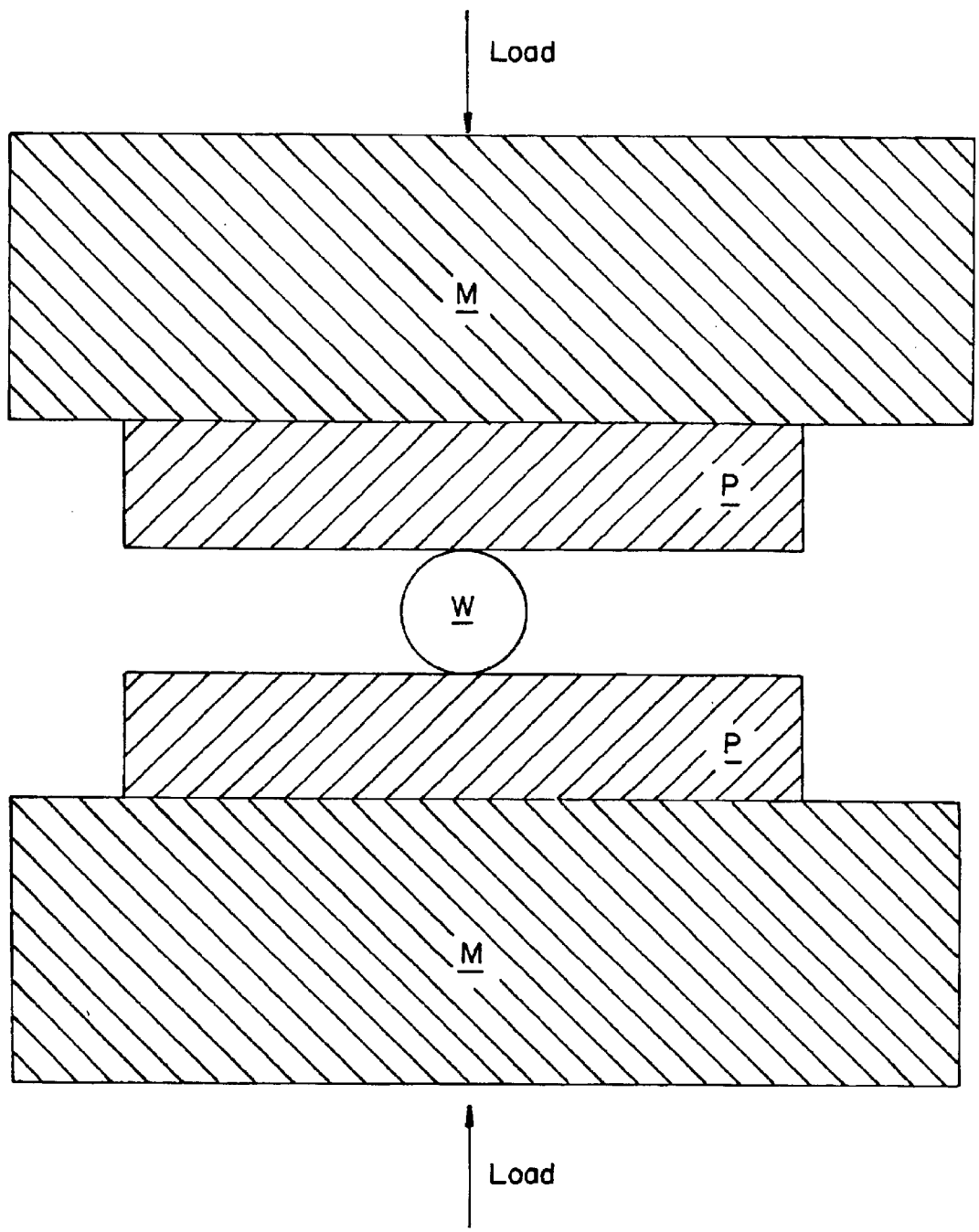
FIG. 2 illustrates the etched wire placed between two flat and polished plates.

The preferred way to make the wire is the controlled etching process described above, although other methods such as drawing glass fibers at elevated temperatures are possible. The cross section of the wire is generally round, but oval or polygonal cross sections are possible. After forming the wire with a nearly atomically smooth surface, the wire is placed between two plates. In the most common embodiment, the two plates are of identical composition and are relatively soft materials, with the initial surfaces being flat and highly polished. The plates are generally very narrow compared to their length. The preferred material is a soft metal such as copper, silver, or gold. Polymers are another possibility. Referring to FIG. 2, a mandrel wire W is shown end-on sandwiched between two plates P. The wire is carefully positioned to assure that it is straight on one plate before introducing the second plate. Because of the varying size of the wire, only the largest diameter section is initially in contact with both plates. The plates are attached to the jaws of a mechanical press M, which is operated and embeds the wire into the plate surfaces. The depth of impression is dependent on the load of the press. It is desirable to form a complete replication of the wires circumference, which may require a high load on the press. In some instances, it may be advantageous for the initial plates to not be exactly flat, but have a small surface curvature in one or both axes. In addition, it may be advantageous for there to be a narrow and shallow longitudinal groove or channel on the plate surface (s) for the wire to lie on. This groove will be deformed around the wire by the application of pressure. The groove can help stabilize the position of the wire, and help facilitate formation of the pressed shape.

Figure 3:
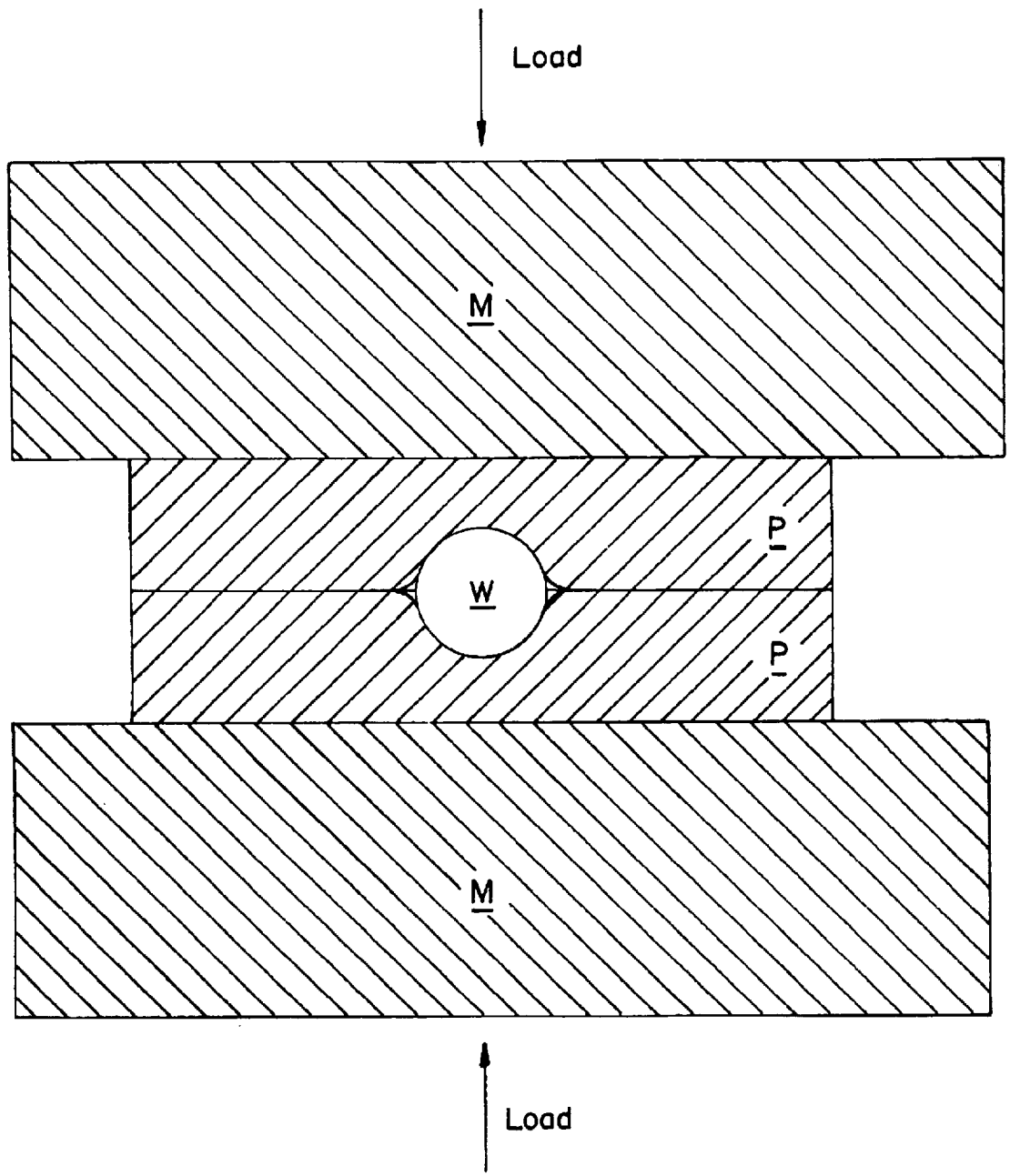
FIG. 3 illustrates the wire after being imprinted into the plates by the application of pressure.

Referring to FIG. 3, an end view of the sandwiched wire W embedded in the plates P is shown after the application of pressure from the press M. Due to the identical composition and annealing of the two plates, there is a symmetrical impression of the wire on both surfaces. This has the advantage of keeping the wire in a straight line as it is pressed into the surface, thereby eliminating any curvature of the final optic.

After the pressing step, the plates are disassembled and the wire is removed. The plates are then carefully aligned and reassembled to form the final capillary optic. In most cases, the ends of the plates are polished down to define the diameter of the entrance and exit apertures before the final assembly. It is also often desirable to grind a bevel onto the end of the plates so that the areas including the apertures of the optic project out further than the rest of the end of the plates. Viewing the ends of the plates under a microscope, and using standard motion stages can achieve alignment.

By using extremely smooth mandrel wires and highly polished plate surfaces, the surface of the wire impression has been found to be smooth enough for good x-ray reflectivity. In addition, the open structure permits a subsequent polishing step on the capillary bore surface after the pressing step if a super polished surface is needed. We note that in the case of extremely small optics (sub-micron openings), it may be advantageous to use only one side of the metal plate due to the difficulties involved in the alignment of two such minuscule apertures. A flat is then attached over this "half optic" to close the capillary channel. This type of optic will still function as a focusing device, but will have a beam with a non-circular cross section.

Before the final assembly of the two plates, it is often desirable to deposit a coating to enhance the reflectivity of the interior surface. For maximizing the performance level of a capillary optic, the material comprising the bore of the capillary should be selected to have the highest reflectivity and the highest critical angle. These two aims are sometimes in conflict as the highest critical angle materials are high-density materials that are not as reflective as the lower density materials that have lower critical angles. For a one-bounce type of optic, the increase in critical angle of a high-density material will, in general, more than offset its lower reflectivity. For multiple-bounce optics, this may not be the case. A full analysis needs to be performed on each particular capillary shape and energy range.

All of the preceding assumes a single layer of reflecting film on the capillary bore. There is a different type of reflecting layer that is a multilayer coating. This is a layer of generally two different materials: a high-Z scattering layer, and a low-Z spacer. These materials function as large d-spacing synthetic crystals that reflect according to Bragg's Law. From Bragg's Law, a strong reflection occurs when the following condition occurs:

$$\lambda = 2d \sin \theta$$

This coating is applied by vacuum deposition from two sources. Since the angle of incidence for radiation is not constant for a capillary that doesn't have a linear taper, Bragg's Law is not strictly observed for a single wavelength along the whole optic. It is possible to compensate for this by having a multilayer with a varying thickness along the taper so that the d-spacing gets smaller as the angle of incidence increases. Such structures have been previously prepared in larger optics. Alternately, the bandwidth of the source, as well as the multilayer bandwidth, is often large enough due the rather small range of incidence angles in these capillaries. A huge advantage of multilayers is that high reflectivity will occur at much larger angles of incidence than with single layers, as long as the condition of Bragg's Law is met. This increases the collection angle of the optic, leading to higher intensity in the transmitted beam. A multilayer-coated optic also acts as a bandpass filter by reflecting mostly at the wavelength determined by Bragg's Law. In many applications, an isolated characteristic emission line of the x-ray tube's target material such as the K-line of copper or molybdenum is desired. Thus, a multilayer-coated optic can be designed to produce an intense and relatively monochromatic beam without any other filters or monochromators.

The reflection-enhancing coatings on the plate surfaces can also be deposited before the pressing step. The constraint with this procedure is that the coating material is not too brittle to prevent cracking during the pressing step.

Figure 4:
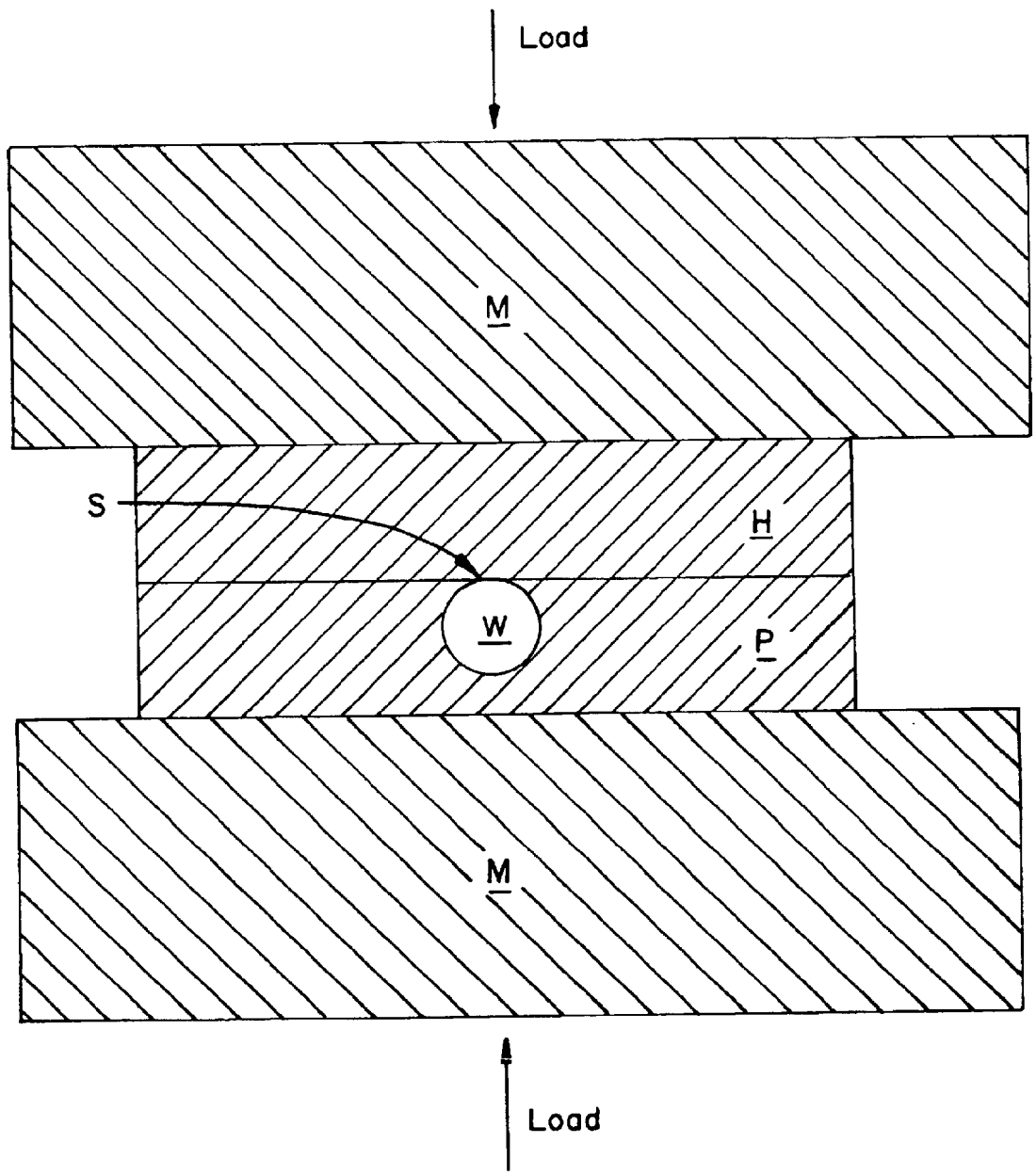
FIG. 4 illustrates a wire imprinted into two plates of different hardness.

Although the preferred embodiment use two identical plates as described above, it is possible to use one plate that is much harder than the other. In this case, the wire is pushed primarily into the softer plate. In this embodiment, it is possible to have more than 180° of the wire's circumference embedded in the soft plate. This is due to the ability of the plate material to plastically flow around the wire during the pressing process. One complication of this type of optic is the need to have the harder plate have an accurately shaped surface figure that corresponds to the figure of the mandrel wire. If this is not done, the wire will be embedded into the soft plate with significant curvature. Another complication is that the wire will be mostly enclosed by the plate material and cannot therefore be simply lifted out of the plate. If the wire cannot be pulled out from the end, it will have to be chemically dissolved in a manner similar to that described in the previously discussed patents. However, in this pressed optic case, there will generally be a very narrow slot that runs along the entire length of the optic that allows easier chemical dissolution than the etching slots used in the other technology. Referring to FIG. 4, we show the cross section of an optic produced by pressing a wire W with both a soft plate P and a much harder plate H. The small slot S that remains can be covered with a material to close the optic. This cover plate might also have a reflecting coating.

The use of a mechanical press has been described for the application of the pressure to mechanically form the optic. It is also possible to consider other means to achieve this. One such possibility is to put the plate-wire-plate sandwich through a roller, such as that used to form rolled metal stock. A roller has the advantage of delivering more local pressure at the contact line when applying a given total load. This can help assure that the mandrel is completely replicated. The main idea of this invention is the use of pressure, created by whatever means, to produce a replicated optic.

Figure 5:
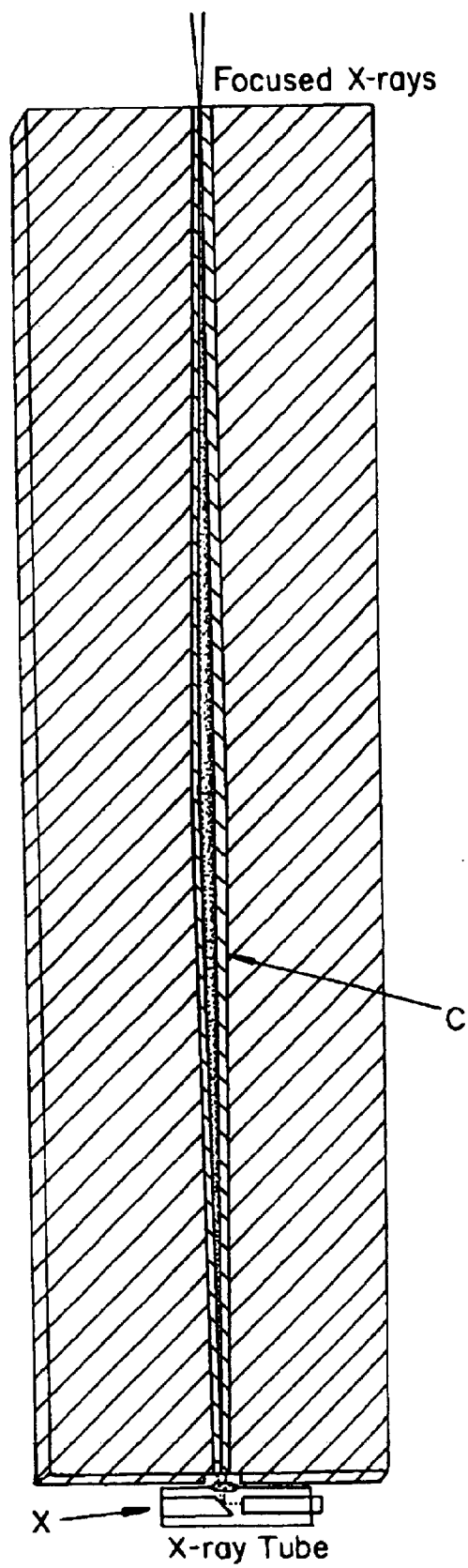
FIG. 5 illustrates an ellipsoidal pressed capillary being used with an x-ray tube source.
Figure 6:
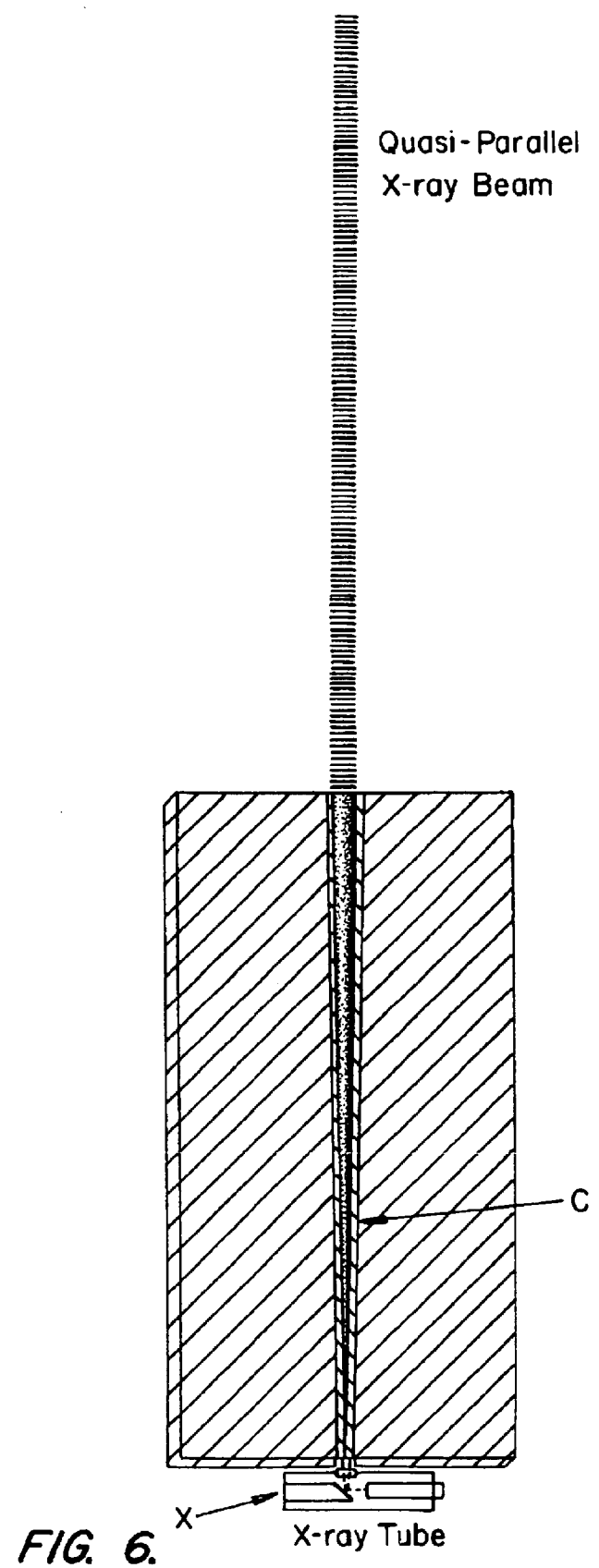
FIG. 6 illustrates a paraboloidal pressed capillary being used with an x-ray tube source.

There are a number of different radiation sources that may be used with these optical elements. We first discuss applications for these optics using quasi point-sources of x-rays. The most important source is the x-ray tube. Referring to FIG. 5, an ellipsoidal pressed-capillary optic C is shown being used with an x-ray tube X. In this geometry, the source is located at one foci of the ellipse, and an image is formed at the other foci. Referring to FIG. 6, a paraboloidal capillary C is shown being used with an x-ray tube X. In this geometry, redirecting the divergent radiation emitted from the source produces a quasi-parallel beam of radiation. These two source and optics arrangements are very desirable for performing experiments in small laboratories. X-ray fluorescence from small volumes of material using ellipsoidal capillaries is one important application. X-ray diffraction, using either ellipsoidal or paraboloidal capillaries is another very useful application of this technology. The paraboloidal optic is also very well suited to the focusing of synchrotron radiation, where the larger end is used as the input for the highly collimated radiation.

When selecting an x-ray tube to use with these optics, it is desirable to use the brightest possible source. It is well known that the maximum power loading that an x-ray tube can dissipate is approximately proportional to the spot size. Thus, the brightest x-ray tubes are microfocus sources, since the power per unit area is highest. Of course, the total flux is not as high, but this is not the important parameter for this application. These microfocus sources have the advantage of smaller size, lower power requirements, and lower cost compared to high power rotating anode sources.

Figure 7:
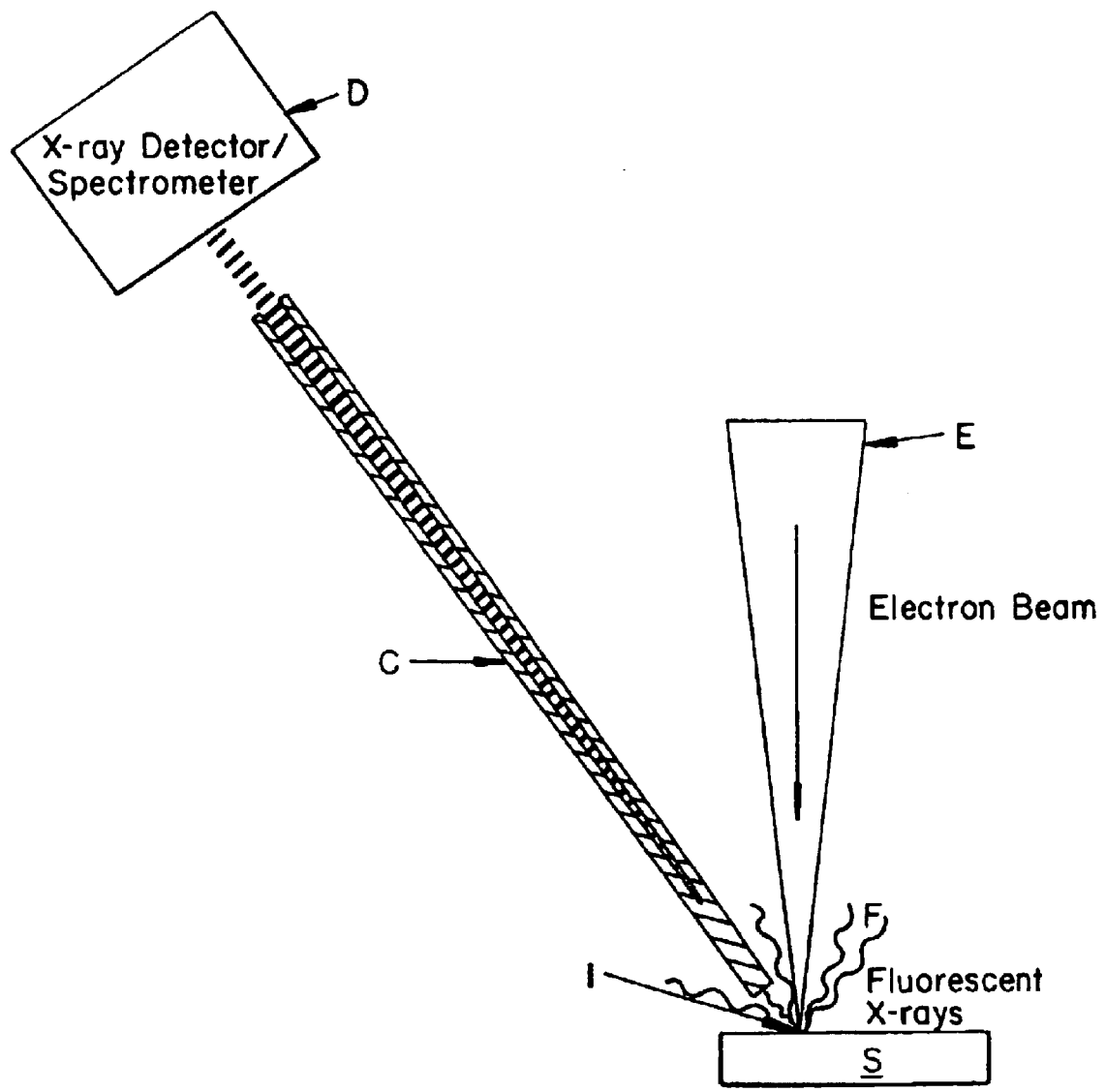
FIG. 7 illustrates a paraboloidal pressed capillary collecting the fluorescent radiation from an electron microprobe spot.

A different application of these optics involves collecting the x-rays emitted from a small volume of material on a specimen in an electron microprobe instrument. This arrangement is fundamentally no different than the use with a microfocus tube. An extremely small electron beam is directed at specific locations on a specimen, and fluorescent x-rays are emitted. This arrangement is often incorporated in a Scanning Electron Microscope (SEM) system. After collecting the fluorescent x-rays, the radiation is directed to a detector that measures the spectral distribution of the radiation for determining the elemental content of the sample. Referring to FIG. 7, an electron microprobe apparatus is shown in which a tightly focused electron beam E impacts a small spot I on the surface of a sample S, thereby generating fluorescent x-rays F. The fluorescent x-rays are collected by a pressed capillary optic C, and relayed to a detector or spectrometer D. Depending on the type of detector used, the optic could be paraboloidal or ellipsoidal.

A different type of radiation source generates short wavelength photons by emission from very hot plasmas. There are several different ways to generate the plasma, but the most common type uses a focused laser beam to heat a target material to an extremely high temperatures. The x-rays from the small plasma volume are collected and redirected as before by the capillary optic. One complication for this type of source is the need to keep debris from the expanding plasma from contaminating the optics. A number of methods have been devised for this. This type of source is especially useful for the generation of soft x-rays where electron impact sources are extremely inefficient.

Figure 8:
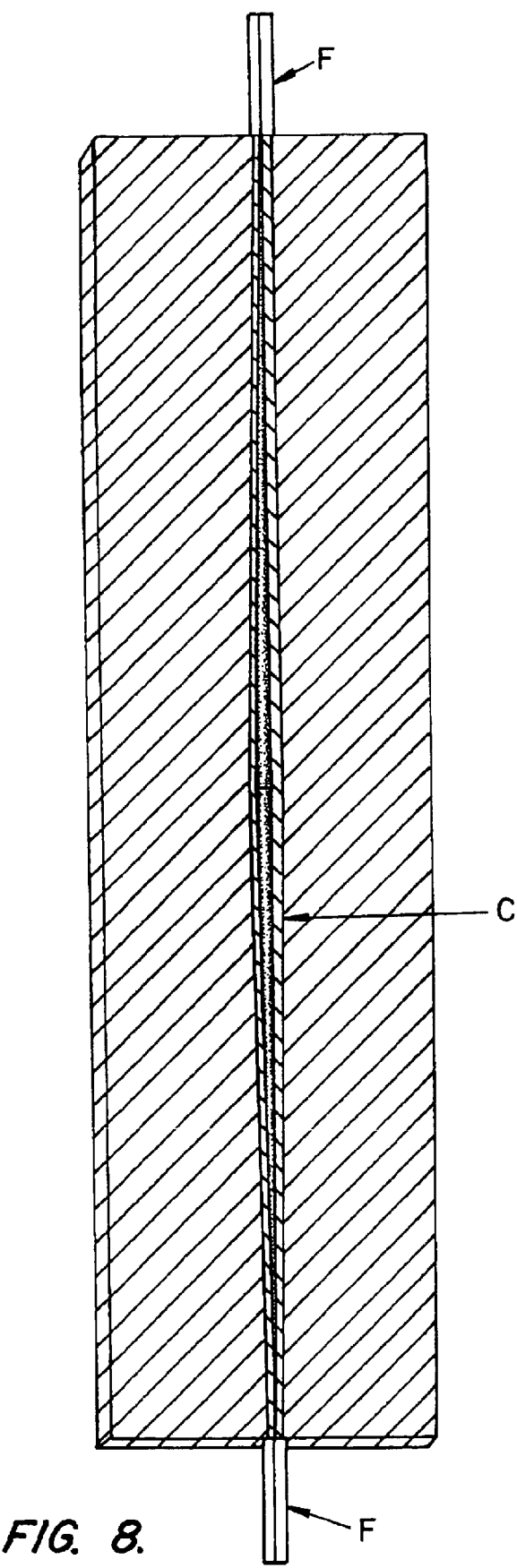
FIG. 8 illustrates an ellipsoidal pressed capillary being used to couple light together from two fiber optic cables.
Figure 9:
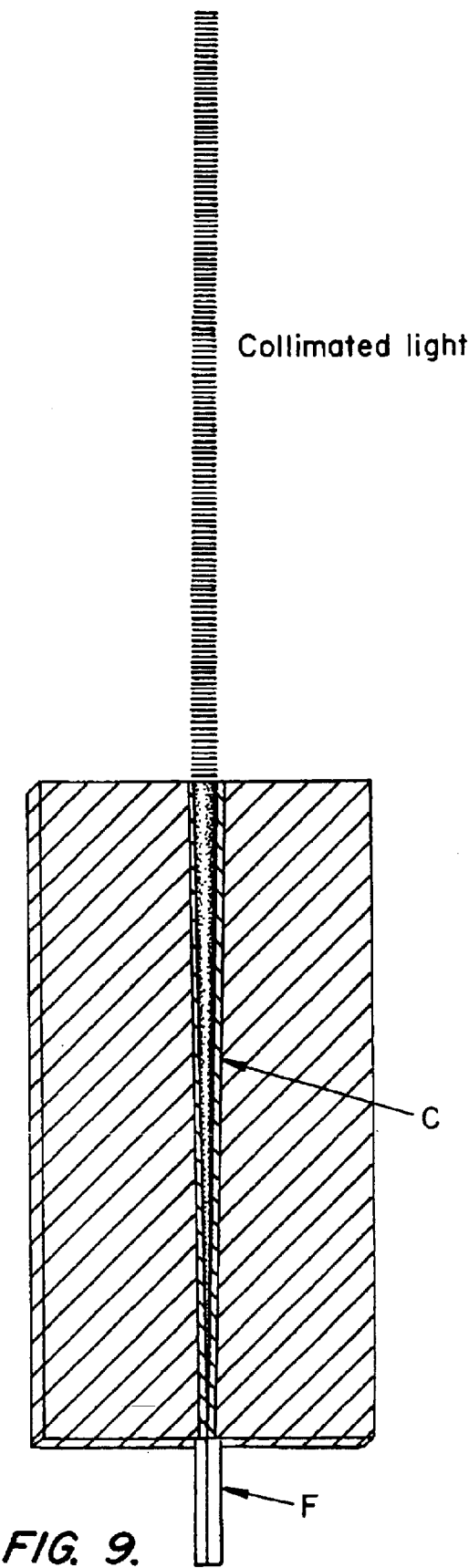
FIG. 9 illustrates a paraboloidal pressed capillary being used to form a collimated beam from a fiber optic cable.

A quite different application of these optics involves visible or near visible light in the field of photonics. In fiber optic communication systems, it is common to have optical devices attached to the end of fiber optic cables. These optics are essential for focusing or collimating the light being projected from a fiber end. Referring to FIG. 8, two fiber optic cables F are coupled together using an ellipsoidal pressed monocapillary optic C. This arrangement allows low-loss coupling with either single or multimode fibers. The ends of the fibers are located close to the foci of the ellipse. Referring to FIG. 9, a collimated beam is produced from the divergent radiation emitted by an optical fiber F using a pressed paraboloidal capillary C. A collimator pair having paraboloidal optics is also useful for coupling two fiber cables together. Both of these applications are analogous to applications using point sources of x-rays. A significant difference is that the devices can operate with much larger reflection angles since they are not limited by the critical angle of reflection associated with x-rays. The reflecting film can be the metal of pressed structure itself, or a deposited layer. As in case of x-rays, this material can be a single layer, or a multilayer coating. A very useful single layer material in the near infrared where most optical fibers operate is gold, due to its high reflectivity. In the case of light, multilayer dielectric films are used. This type of coating is commonly applied to optical devices, and function using constructive interference at a specified wavelength in a similar manner to multilayer x-ray mirrors. An optic using multilayer coatings would also function as a bandpass element, and could be used to preferentially transmit a narrow wavelength spectrum of radiation.

These previous arrangements are also useful for focusing a laser source to form either a collimated beam, or to couple a laser into a fiber. In one common application, a laser diode would be placed at one foci of an ellipsoidal optic and the end of a fiber optic would be placed at the other foci. This would couple the somewhat divergent laser emission from the diode into the fiber core. In a different example, a laser diode would be placed at the focus of a paraboloidal optic to produce a collimated beam. With a less divergent laser such as a He—Ne laser, a paraboloidal capillary collimator would be useful for efficiently coupling the laser emission into a fiber.

Figure 10:
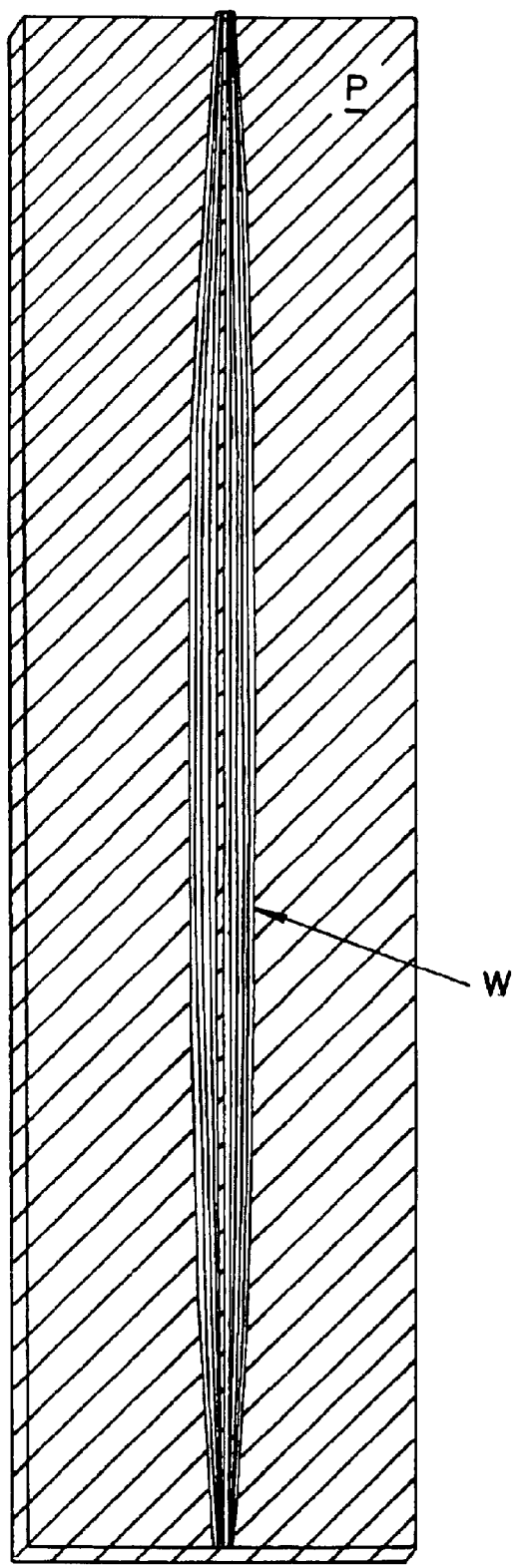
FIG. 10 illustrates an array of many on wires on a pressing plate arranged for creating a polycapillary optic used for point-to-point focusing.
Figure 11:
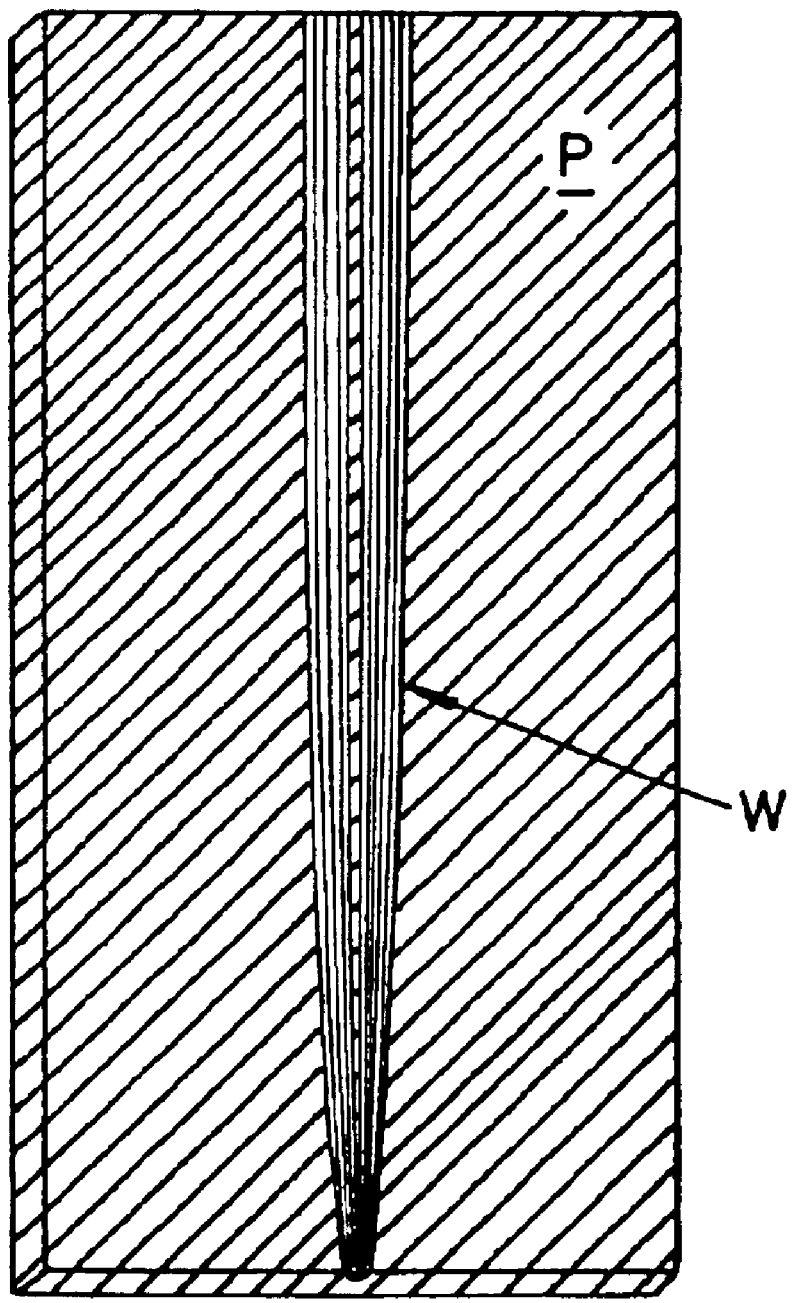
FIG. 11 illustrates an array of many wires on a pressing plate arranged for creating a polycapillary optic used for line-to-point focusing.

Finally, we discuss the ability to form optics involving more than one wire. We previously mentioned a pending patent BUNDLED MONOCAPILLARY OPTICS, in which large numbers of mandrel wire are bonded together to form a polycapillary structure. The pressing technology being described here can also be extended into the area of polycapillary optics. Although it would be difficult to form a close-packed bundle of channels as described in that application, it is possible to form a planar array of wires on a plate that can be pressed to form an optic with a multitude of reflecting channels. Furthermore, it is possible to stack several of these plates together to form a quasi-bundled optic. Referring to FIG. 10, an array of wires W is shown arranged on a plate P prior to being mechanically pressed to form a polycapillary optic in the same manner as is done with a single wire to press a monocapillary optics. In this type of polycapillary optic, the wires are not straight, with the exception of the central one. Instead, the wires are curved so that the ends of all the wires face two points that corresponds to a source and a focus. Referring to FIG. 11, an array of wires W is shown arranged on a plate P in which the wires face a point on one end, and are parallel on the other end. One application of this type of optic would be to direct the radiation from a line focus x-ray tube to a point. Both of these arrangements are analogous to the arrangement of the individual channels in a glass polycapillary optic. Furthermore, the wires could be either tapered or non-tapered in such an optic. This is also analogous with the monolithic, or the multifiber versions of glass polycapillaries.

Figure 12:
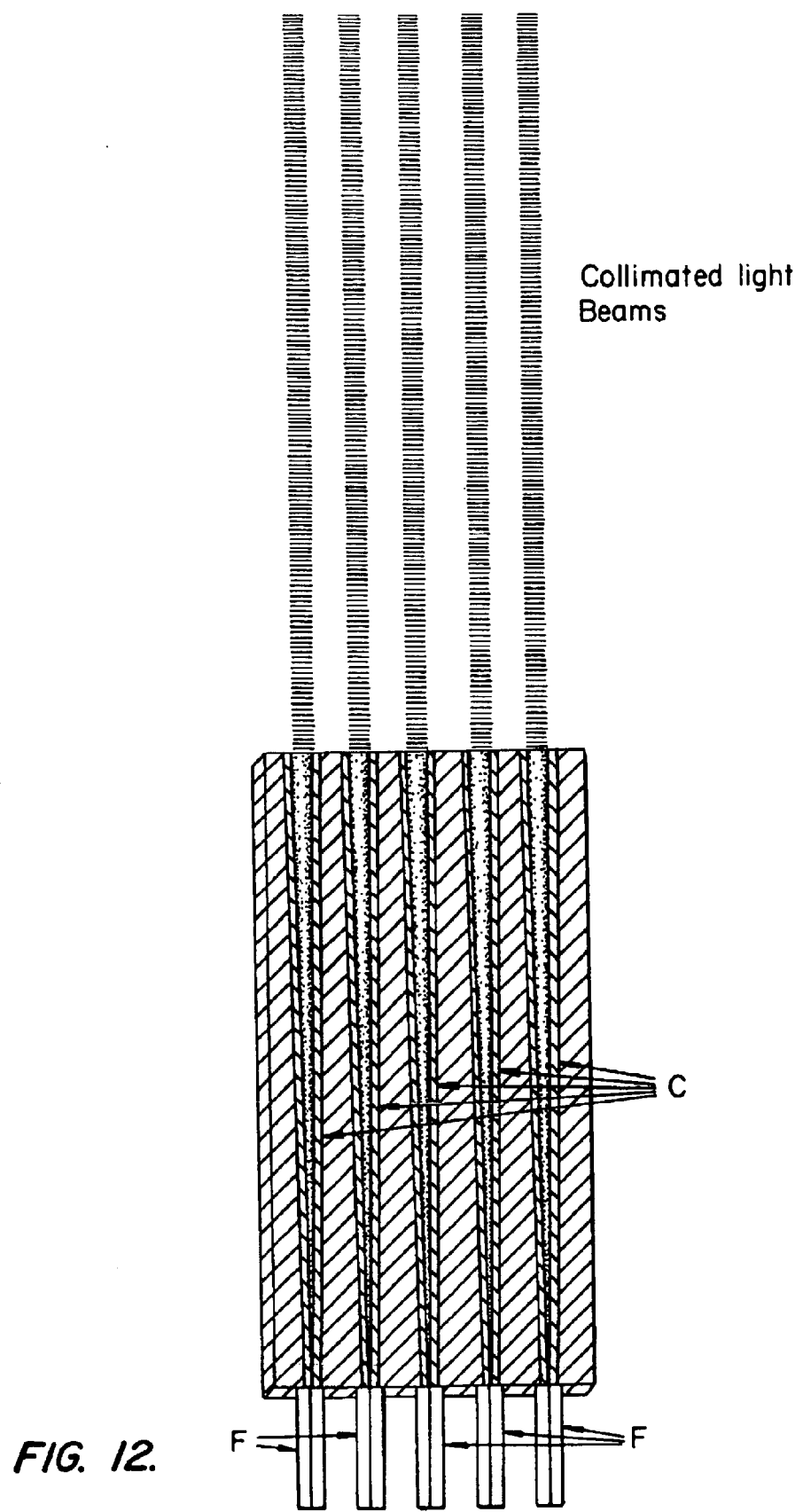
FIG. 12 illustrates an array of many wires on a pressing plate arranged for creating an array of parallel collimating optics.

There is another geometry that could be considered as lying between that of a monocapillary and a polycapillary optic. This arrangement has a number of mandrel wires arranged on the pressing plate with a significant space between them. In most instances, the wires axes are straight and are also parallel to each other. This forms essentially an array of parallel pressed-monocapillary optics. An important photonics application of this type of assembly is the formation of a collimator array. This could be used in several applications, the most obvious being optical-networking switches. Referring to FIG. 12, a series of fiber optic cables F are each aligned to separate paraboloidal pressed capillary channels C formed in pressing plate or plates P. In a typical application, the collimated output of one optical fiber/ collimating channel could be directed to a different fiber by bouncing off the tiny mirrors of a microelectromechanical systems (MEMS) optical switch placed beyond the capillary array. This application, as well as the previously described photonics applications are commonly accomplished with small-diameter gradient index (GRIN) lenses. An advantage of these capillary optics is that there is no dispersion due to their reflective rather than refractive focusing operation. It is also possible to produce smaller capillary lenses than typical GRIN lenses using pressed capillary channels.

The positioning of the individual wires in any polycapillary pressed optic would require significant care to assure that the wires are positioned or aimed correctly. One way to achieve this is to have shallow grooves present on one plate that hold the wires in the correct position until the other plate is introduced in the pressing step. Alternately, a pressing die as previously mentioned for monocapillary optics could be used. This die could be manufactured by attaching wires onto a rigid substrate as previously described as a possible mandrel for pressing a monocapillary optic, or by some other means.

Figure 13:
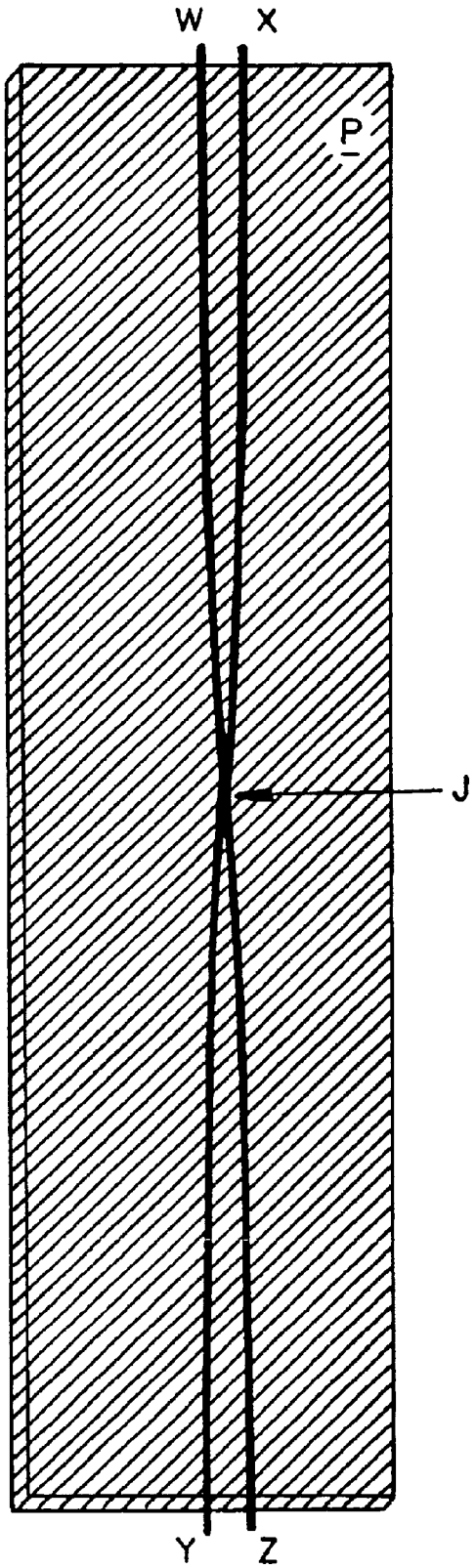
FIG. 13 illustrates four wires fused together and positioned on a pressing plate for creating an optical coupler or splitter.

The ability to form pressed optics with multiple capillary channels has photonics applications beyond the collimator array described above, and which are distinct from the single channel uses. One such use is to combine several separate input channels into one or more output channels. Alternately, a single channel could be split into several separate output channels. Such devices are commonly referred to as couplers and splitters. Other combinations are possible. By using different entrance apertures on separate channels, it is possible to achieve different coupling ratios on different capillary channels, as is commonly accomplished on other couplers. Referring to FIG. 13, an arrangement for mechanically pressing an optical coupler is shown. In this device, four wires W, X, Y, and Z are fused together at a common intersection point J. The fused wire assembly is positioned on one of the pressing plates P before being pressed into the final optic. As with the other types of pressed optics, other types of molds besides wires are applicable.

When combining different wavelength signals propagating on separate channels into another common channel, the device is known as a wavelength division multiplexer or WDM. It is possible to provide reflecting coatings on the surface of the capillary channels having different bandpass characteristics on different channels to provide separation of wavelengths. Multilayer dielectric coatings are commonly used to produce wavelength specific mirrors. This permits a device to have a common input with multiple wavelengths, and separate outputs with single wavelengths. The device can be used to either combine separate wavelengths from two inputs into a common output, or to run it in the other direction to separate the signals. Obviously, more channels than three can also be used.

In the following claims the term is used that "a mold having an external profile figured for radiation transmission along an axis" is used. We have set forth limitations related to the transmission of X-rays and neutrons. Further, reflective surfaces are well known for the transmission of conventional light. The important point is that the mold we have used has an exterior surface that permits transmission of radiation along an axis, typically between two points. Ideally, the figure of the mold is optimized for the most efficient transmission of the specific radiation being used along this axis.

What is claimed is:

1. A method of producing a capillary optic by impression comprising the steps of:

providing a wire mold having an external profile figured for reflective radiation transmission along a capillary axis;

providing at least one soft plate having a surface for reflective radiation transmission, impressing the wire mold into the soft plate;

removing the wire mold from the soft plate to leave a vacant capillary impression figured for reflective radiation transmission in the soft plate along the capillary axis, and enclosing the vacant impression to provide for reflective radiation transmission along the axis of the vacant capillary impression.

2. The method of producing a capillary optic by impression according to claim 1 and wherein:
    the enclosing step includes:
    etching the wire mold out of the soft plate.

3. The method of producing a capillary optic by impression according to claim 1 wherein:
    impressing the wire mold into two soft plates on either side of the wire mold.

4. The method of producing a capillary optic by impression according to claim 1 and wherein:
    the enclosing step includes placing a cover plate over the vacant impression-figured for reflective radiation transmission alone a capillary axis.

5. The method of producing a capillary optic by impression according to claim 1 and wherein:
    providing two plates of material on either side of the wire mold;
    impressing the plates over the wire mold to leave a capillary impression in each plate for forming part of a vacant impression for reflective transmission; and,
    enclosing the impression to provide for reflective radiation transmission along the capillary axis of the impression by aligning the impression in each plate for forming a single cavity for reflective radiation transmission.

6. The method of producing a capillary optic by impression according to claim 1 and wherein:
    the wire mold is produced by an differential etching process.

7. The method of producing a capillary optic by impression according to claim 1 and wherein:
    providing two plates of identical materials; and,
    the impressing step provides symmetrical imprints on the two plates.

8. The method of producing a capillary optic by impression according to claim 1 and wherein:
    providing two plates of different materials; and
    the impressing step provides asymmetrical imprints.

9. The method of producing a capillary optic by impression according to claim 1 and wherein:
    the impressing step includes the use of rollers.

10. The method of producing a capillary optic by impression according to claim 1 and wherein:
    the mold having an external profile figured for radiation transmission is a paraboloid.

11. The method of producing a capillary optic by impression according to claim 1 and wherein:
    the mold having an external profile figured for radiation transmission is an ellipsoid.

12. The method of producing a capillary optic by impression according to claim 1 and including the additional step of placing a reflection enhancing film on the vacant impression before enclosing the optic.

13. The method of producing a capillary optic by impression according to claim 12 wherein the reflection enhancing film is a multi-layer coating.

14. The method of producing a capillary optic by impression according to claim 1 and including the steps of:
    communicating the enclosed vacant impression with an x-ray tube to provide for reflective radiation transmission along the axis of the vacant impression.

15. The method of producing a capillary optic by impression according to claim 1 and including the steps of:
    communicating the enclosed vacant impression with synchrotron radiation to provide for reflective radiation transmission along the axis of the vacant impression.

16. The method of producing a capillary optic by impression according to claim 1 and including the steps of:

communicating the enclosed vacant impression with an electron microprobe instrument to provide for reflective radiation transmission along the axis of the vacant impression.

17. The method of producing a capillary optic by impression according to claim 1 and including the steps of:

communicating the enclosed vacant impression with light chosen from the group including visible, ultraviolet, or infrared light to provide for reflective radiation transmission along the axis of the vacant impression.

18. The method of producing a capillary optic by impression according to claim 17 wherein the light originates to the vacant impression from optical fibers.

19. The method of producing a capillary optic by impression according to claim 17 wherein the light originates from lasers.

20. The method of producing a capillary optic by impression according to claim 1 wherein the mold includes more than one wire.

21. The method of producing a capillary optic by impression according to claim 1 wherein an optical coating is placed before the impressing step.

22. The method of producing a capillary optic by impression according to claim 1 wherein:

the plate has curvature.

23. The method of producing a capillary optic by impression according to claim 1 wherein:

the plate includes a groove to align the mold.

24. An optical connector including:

two soft plates having a surface for reflective radiation transmission, a vacant impression into each soft plate having an internal profile of a reflective cavity figured for reflective radiation transmission along a capillary axis; and, the plates being aligned to register their respective external profiles to provide for reflective radiation transmission along the capillary axis of the vacant impression.

25. A process of connecting optical fibers comprising the steps of:

providing at least one soft plate having a surface for reflective radiation transmission;

placing a vacant impression into the soft plate having an external profile figured for reflective radiation transmission along an axis;

placing at least one optical fiber having an end to emit radiation into the vacant impression; and, enclosing the external profile to permit radiation to travel between the optical fiber and the vacant impression.

26. The process of connecting optical fibers according to claim 25 and wherein:

placing at least two optical fibers having ends to emit radiation into the external profile from opposite ends of the external profile.

27. The process of connecting optical fibers according to claim 25 and wherein:

more than one vacant impression is placed into the soft plate having an external profile figured for radiation transmission along an axis.

* * * * *